United States Patent Office 2,826,195
Patented Mar. 11, 1958

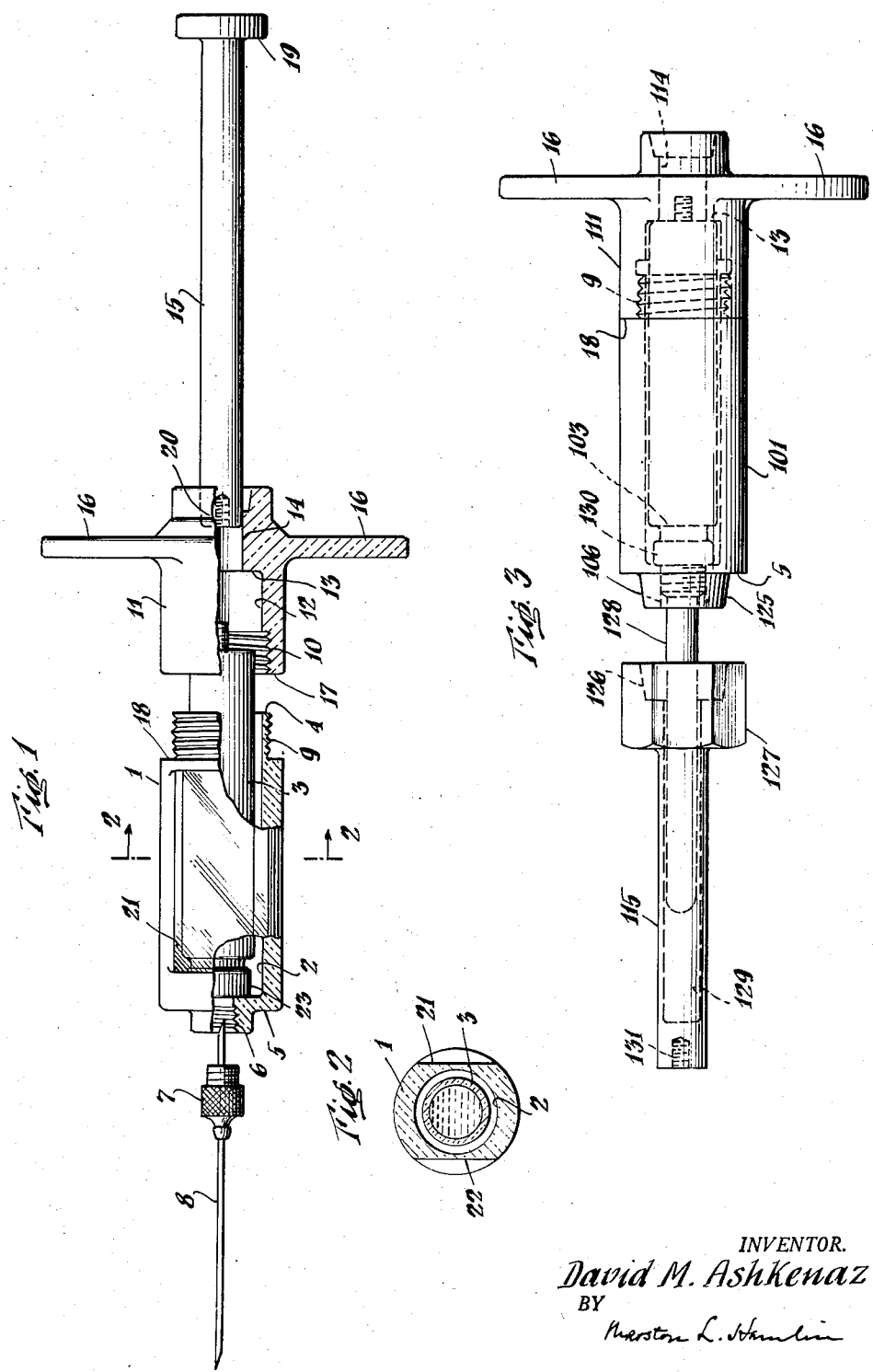

2,826,195

PLASTIC INJECTION SYRINGE

David M. Ashkenaz, Bala Cynwyd, Pa., assignor to American Home Products Corporation, New York, N. Y., a corporation of Delaware Application May 22, 1956, Serial No. 586,425

5 Claims. (Cl. 128—218)

This invention relates to a plastic injection syringe designed to be used with an injection needle and a transparent glass ampule containing an injectable drug. The syringe is adapted to receive and be used with separately supplied needles and ampules or with the more recently developed cartridge-needle units.

In the past plastic syringes have been developed in which the plastic barrel contained the injectable drug. These had the disadvantages that the dimensional stability of the plastic under varying temperature and humidity conditions was not sufficient to ensure an easy sliding fit of the plunger that was at the same time liquid-tight, that certain injectables were not free of interaction with the plastic and that the plastic was permeable to water and solvent vapors on long storage. My syringe avoids these disadvantages.

Other syringes have been made of opaque material, having slots cut in the sides to expose the ampule in the syringe to view. This has the disadvantage that the ampule is more subject to breakage, especially under adverse conditions of use as in military field operations. This disadvantage is also avoided in my syringe.

Since syringes may be fabricated of synthetic plastics more cheaply than of metal, my syringe may be manufactured very economically without incurring the above described disadvantages of previous plastic syringes.

Objects of my invention are to provide a syringe adapted to receive and be used with ampules of injectable drugs with or without attached needles, to provide means for rapid and easy loading and unloading of the syringe, to completely enclose the ampule in the syringe without obstructing its visibility, and to provide a syringe of simple and rugged construction.

According to my invention my syringe is made of a translucent or transparent plastic. Representatives of such plastics are nylon, polystyrene, methyl methacrylate and polyethylene. Of these, nylon and special forms of polystyrene and polyethylene have sufficient heat stability to permit sterilization in boiling water. The syringe consists of a cylindrical barrel adapted to enclose and completely surround an ampule; a head removably closing one end of the barrel; and a push-rod adapted to engage a slideable plunger in the ampule.

The barrel has a cylindrical bore, open at the proximal end which is closed by the head. The distal or needle end is partially closed by an integral wall which has a central opening wide enough to receive a double-pointed injection needle; this opening may be provided with a female thread adapted to mate with a male thread on the hub of an injection needle. The proximal end of the barrel has means for removably engaging the head; this means is advantageously a male thread engaging a female thread in the head, but may be a bayonet joint, interrupted thread or similar device. If the barrel is made of a translucent plastic such as nylon, flat areas on opposite sides are ground away or otherwise thinned sufficiently to make the ampule in the syringe visible, but not sufficiently to destroy the integrity of the barrel wall.

The head is a cylindrical closure for the barrel, provided with an opening at its proximal end to permit passage of the push rod, and with means at its distal end to removably engage the barrel, preferably a female thread. The head in its distal portion has a bore of sufficient diameter to receive the proximal end of the ampule in the syringe; midway of the head this bore is reduced by a shoulder adapted to engage the proximal end of the ampule. The head is preferably provided with finger pieces or a flange to provide opposition to thumb pressure on the push-rod when the syringe is being used for injection.

The push-rod has means at its distal end for engaging the plunger of the ampule and may have a thumb piece at its proximal end. In one modification the push-rod is hollow so that it may serve as a needle guard when the syringe is loaded. In this case the proximal end is enlarged and provided with means for being removably attached to a projection on the barrel surrounding the distal opening; such means may be a threaded connection or a tapered friction joint or the like.

The accompanying drawing and the following description illustrate embodiments of my invention, but these are to be taken as illustrative only and not as limiting the scope of my invention which is defined in the appended claims.

In the drawing Fig. 1 is a side view of one of my syringes partially disassembled and partially cut away to show the interior arrangement;

Fig. 2 is a transverse section on line 2—2 of Fig. 1; and

Fig. 3 is a side view of a modified form of syringe with the push-rod-needle-cover partly withdrawn.

In Fig. 1, a barrel 1 of translucent nylon has an inner bore 2 of a suitable diameter to hold a glass ampule 3. The cylindrical bore 2 extends for its full width to the proximal end 4 of the barrel. The distal end of the barrel is closed by an integral wall 5 having a central threaded opening 6 into which the threaded hub 7 of a double-pointed injection needle 8 may be screwed. The proximal end of the barrel is provided with a male thread 9 mating with female thread 10 in head 11. The head has a bore 12 of the same diameter as bore 2 in its distal portion, the bore terminating proximally in a shoulder 13. A smaller bore 14 in the proximal portion of the head permits passage of push-rod 15. The head is provided with two finger pieces 16. When the head is screwed home on the barrel, its distal end 17 seats on shoulder 18 of the barrel. The combined length of bores 2 and 12 between shoulder 13 and the inner surface of wall 5, when the head is assembled on the barrel, is such as to retain ampule 3 against substantial longitudinal movement. Push-rod 15 advantageously has a thumb piece 19 at its proximal end and may be provided at its distal end 20 with a screw thread engaging the slideable plunger of ampule 3. On opposite sides of barrel 1, the walls are thinned over rectangular areas 21 and 22 sufficiently to permit the ampule and its contents to be viewed by the user but not sufficiently to interrupt the continuity of the barrel wall. A minimum thickness of the order of 0.02 in. is suitable.

In using this syringe, needle 8 is removed from its sterile packing and is mounted on the barrel by screwing hub 7 into opening 6, the proximal point of the needle then lying within the barrel bore. Ampule 3 is inserted in the barrel with its pierceable closure 23 towards the needle, and head 11 is screwed home on the barrel. The pressure of shoulder 13 on the ampule forces it against the inner point of the needle which pierces the closure and thus establishes communication with the ampule contents. The distal end of push-rod 15 is then engaged with the ampule plunger and the injection is made in the usual way.

The syringe illustrated in Fig. 3 is made of transparent water-white polystyrene; alternatively transparent water-white methyl methacrylate may be used. Because of the transparency of these materials, cut-away areas of the barrel to provide visibility such as 21 and 22 are unnecessary. Barrel 101 is similar to barrel 1 but without the reduced side areas. Head 111 is also similar to head 11 but bore 114 is larger than bore 14 for the reasons described below. At its distal end, barrel 101 is provided with a tapered projection 125 mating with the tapered bore 126 in the enlarged end 127 of push-rod 115 to form a friction joint. The enlarged end of the push-rod serves as a thumb piece.

The ampule 103 in the syringe forms part of a cartridge-needle unit as shown in Fig. 2 of Dann Patent 2,671,450. The opening 106 in the distal end of the barrel is sufficiently large to permit easy passage of the injection needle with its rubber sheath 128, but is small enough not to permit passage of closure 130 of the ampule. When the syringe is loaded the cartridge-needle unit is thus held against longitudinal movement by wall 5 and shoulder 13.

Push-rod 115 has an axial bore 129 sufficiently large and long to accommodate needle and sheath when the push-rod is mounted on the distal end of the syringe by friction joint 125—126; in this position it serves as a protecting cover for the needle. The extreme distal end of the push-rod has an axial threaded hole 131 designed to mate with a threaded stud molded into the slideable plunger of the cartridge-needle unit.

In use, head 111 is removed from barrel 101, a cartridge-needle unit 103—128 is slid or dropped into the barrel and the head replaced. If the syringe is not to be used at once for an injection, the push-rod 115 is secured over the sheathed needle 128 by friction joint 125—126. The syringe is then secure against inadvertent damage or contamination under all ordinary conditions of shipment or handling, e. g. when carried in a physician's bag. When an injection is to be given, the distal end of push-rod 115 is inserted through opening 114 and threaded hole 131 is engaged with the ampule plunger stud. It will be seen that opening 114 must be large enough to accommodate a push-rod 115, which in turn must be of sufficient diameter to have a bore surrounding sheathed needle 128. After removal of the needle sheath, the needle is inserted in the patient and the injection given, preceded if required by a trial aspiration of tissue fluid.

From the above description, it will be seen that I have devised a syringe adapted to be used with prepared glass cartridges, with or without attached needles, the cartridge ampules being entirely enclosed in the barrel of the syringe and thus protected against breakage, while the contents of the cartridge ampules are at all times visible. The syringe is readily loaded and unloaded, is simple and rugged in construction and devoid of small and fragile parts.

I claim:

1. A syringe fabricated of a light-transmitting-synthetic plastic comprising: (a) a barrel, (b) a head and (c) a push-rod, the barrel having a cylindrical bore of a diameter to receive a cartridge containing an injectable drug, the barrel being open at the proximal end and closed at the distal end by an integral wall forming an abutment for the distal end of the cartridge and containing an axial opening smaller than the bore and adapted to receive an injection needle, the barrel side wall being continuous for its entire length and circumference and having at least a portion of its area of sufficient thinness to permit viewing the cartridge in the barrel, and means at the proximal end of the barrel to removably attach the head; the head having a cylindrical bore in its distal portion of the same diameter as the bore of the barrel, the head being closed at its proximal end by an integral wall having an axial opening permitting the passage of the push-rod, the wall forming an abutment for the proximal end of the cartridge, the sum of lengths of the bore in the barrel and the bore in the head when the head is mounted on the barrel being just sufficient to contain the cartridge and prevent its longitudinal movement, the head having adjustable attaching means at its distal end mating with the attaching means on the barrel; the push-rod having a diameter sufficiently small to permit its entry into the bore of the cartridge and having positive means at its distal end to engage a sliding plunger in the cartridge.

2. The combination comprising a cartridge consisting of an ampule having a penetrable closure at one end and slidable plunger at the other with an injectable drug therebetween, and a syringe as defined in claim 1, the cartridge being secured against longitudinal movement in a syringe barrel by abutment at one end against the end wall of the syringe barrel and at the other against the end wall of the head.

3. A syringe as defined in claim 1 in which the synthetic resin is translucent and the barrel side wall is thinned in at least one area sufficiently to make an ampule contained in the barrel visible to the user, but insufficiently to destroy the continuity of the side wall.

4. A syringe fabricated of transparent plastic comprising: (a) a barrel, (b) a head and (c) a push-rod, the barrel having a cylindrical bore of a diameter to receive a cartridge containing an injectable drug, the barrel being open at the proximal end and closed at the distal end by an integral wall forming an abutment for the distal end of the cartridge and containing an axial opening smaller than the bore and adapted to receive a sheathed injection needle, the barrel side wall being continuous for its entire length and circumference, and a screw thread at the proximal end of the barrel to adjustably attach the head; the head having a cylindrical bore in its distal portion of the same diameter as the bore of the barrel, the head being closed at its proximal end by an integral wall having an axial opening permitting the passage of the push-rod, the wall forming an abutment for the proximal end of the cartridge, the sum of the lengths of the bore of the barrel and the bore of the head when the head is mounted on the barrel being just sufficient to contain a cartridge and prevent its longitudinal movement, the head being provided with a screw thread mating with the screw thread at the proximal end of the barrel; the push-rod having positive means at its distal end to engage a sliding plunger in the cartridge, having an outside diameter sufficiently small to permit its entry into the bore of the cartridge and having an axial bore large enough to accommodate a sheathed injection needle, the bore being enlarged at its proximal end to form a joint with the distal end of the barrel, whereby the push-rod may serve as a protective covering for a sheathed injection needle constituting part of a cartridge-needle unit contained in the syringe.

5. In combination, a syringe as defined in claim 4 and a cartridge-needle unit mounted in said syringe with its needle protected by the hollow push-rod, the cartridge-needle unit comprising a transparent glass ampule containing an injectable drug, closed at its proximal end by a slideable plunger engageable with the distal end of the push-rod and having mounted on its distal end a sterile sheathed injection needle.

References Cited in the file of this patent

UNITED STATES PATENTS

| | | |
|---|---|---|
| 1,471,644 | Bandman | Oct. 23, 1923 |
| 2,685,878 | Seifert et al. | Aug. 10, 1954 |
| 2,720,880 | Whitaker et al. | Oct. 18, 1955 |
| 2,728,341 | Roehr | Dec. 27, 1955 |